April 20, 1937.  G. G. LLOYD  2,078,005
MILL PLANT FOR ROLLING HOT METAL
Filed Dec. 26, 1934  7 Sheets-Sheet 2
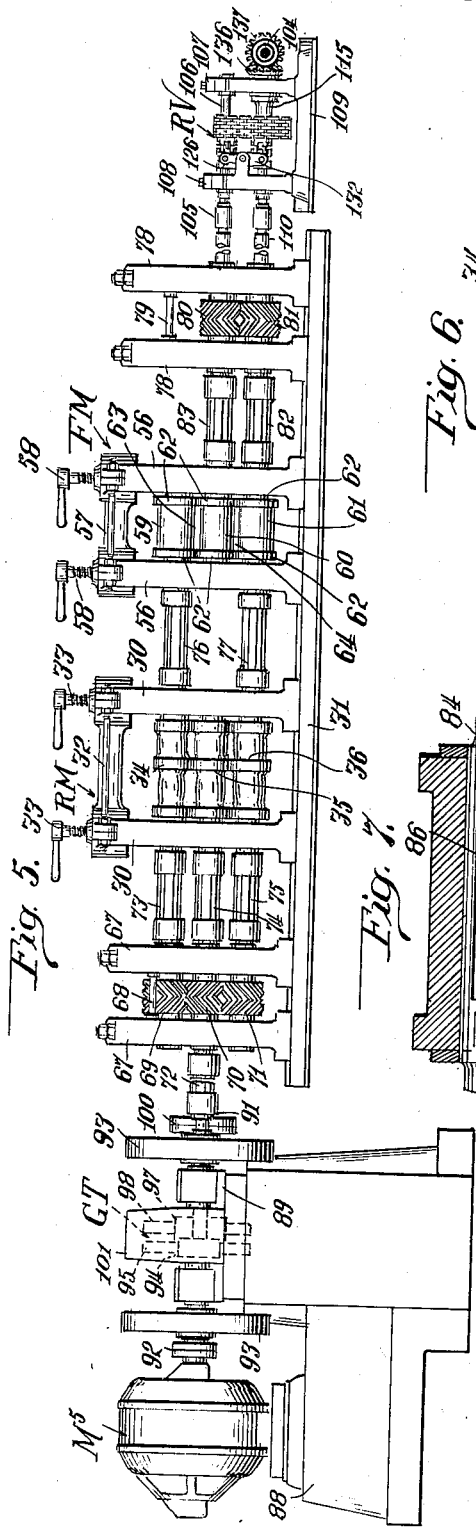
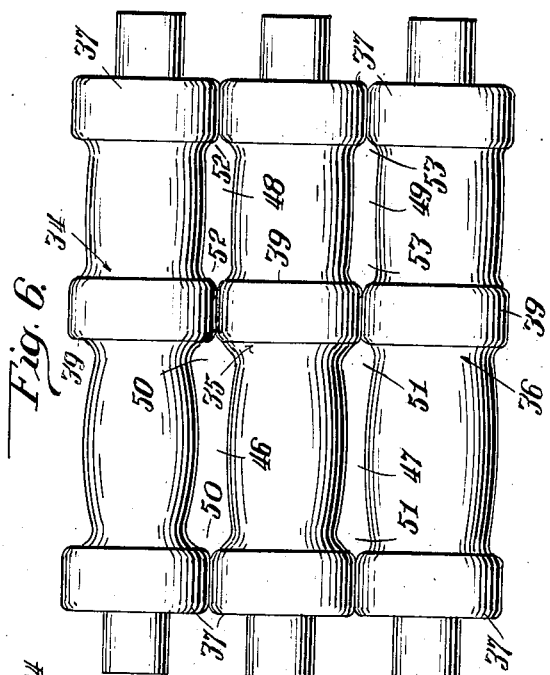
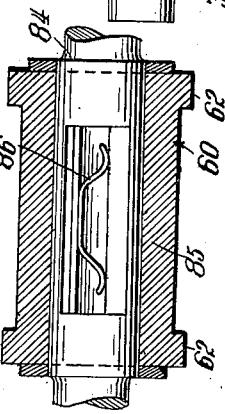
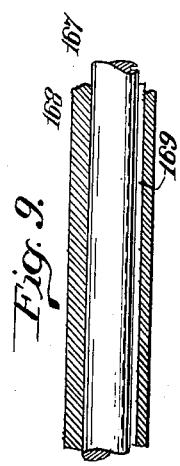
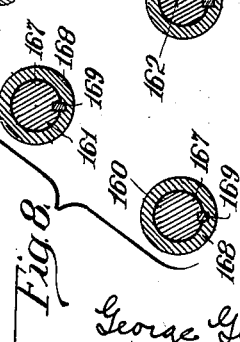
Inventor
George Gordon Lloyd.
By Thomas H. Ferguson
Attorney.

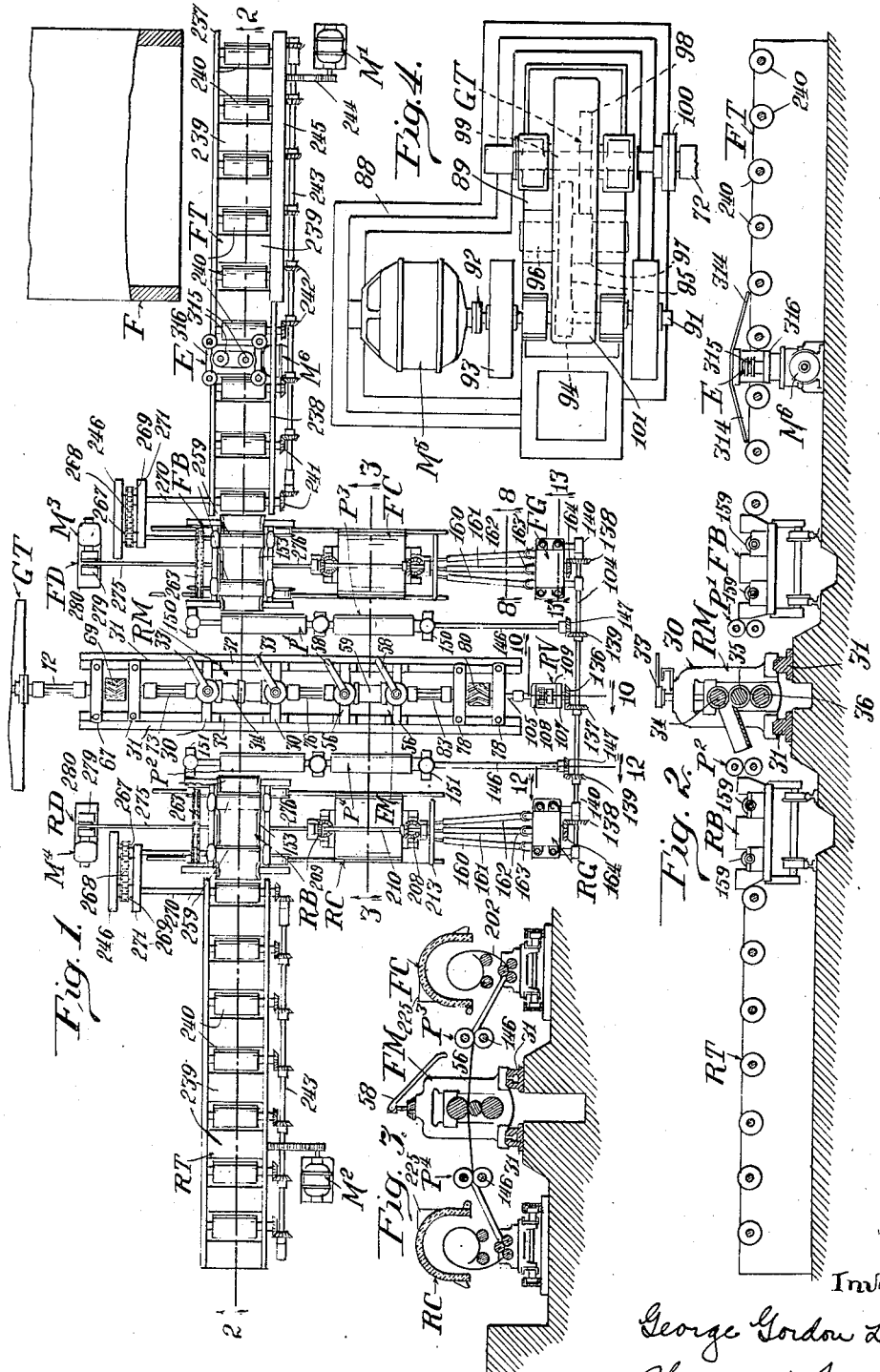

April 20, 1937.　　　　G. G. LLOYD　　　　2,078,005
MILL PLANT FOR ROLLING HOT METAL
Filed Dec. 26, 1934　　　7 Sheets-Sheet 3
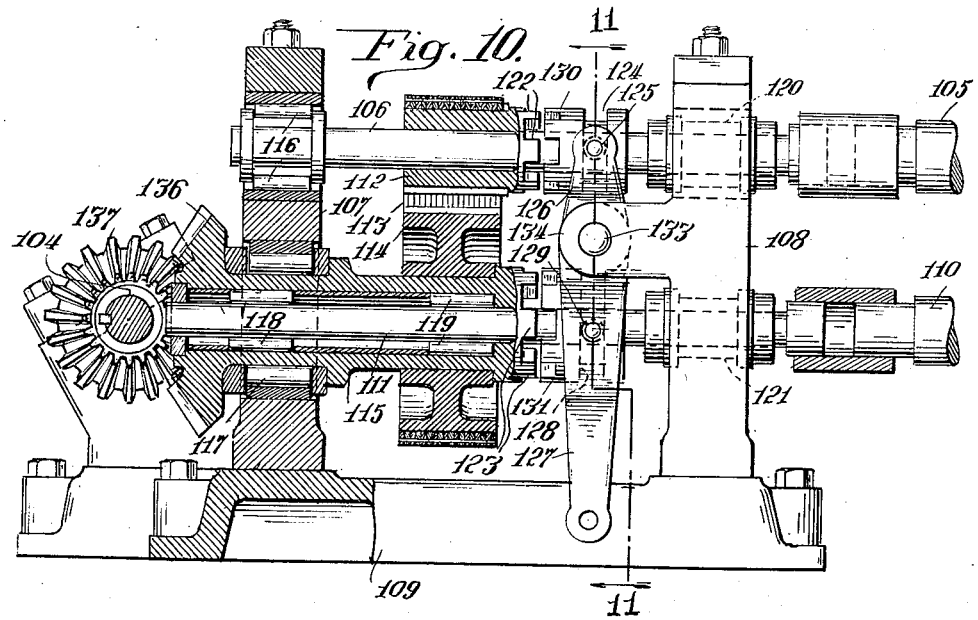
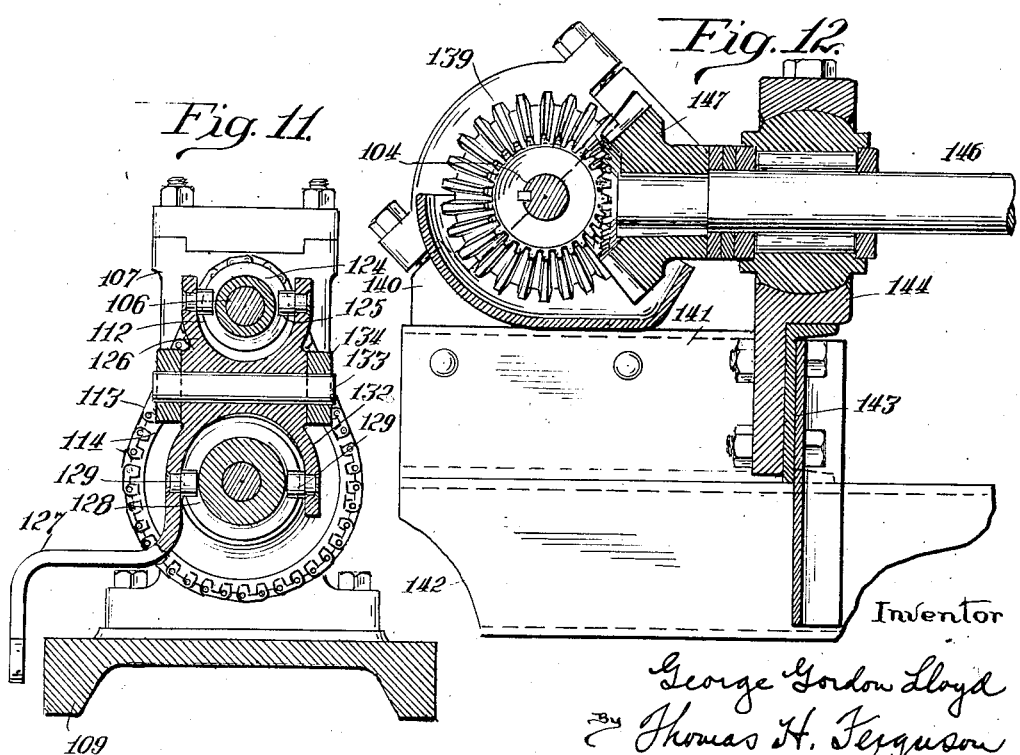
Inventor
George Gordon Lloyd
By Thomas H. Ferguson
Attorney

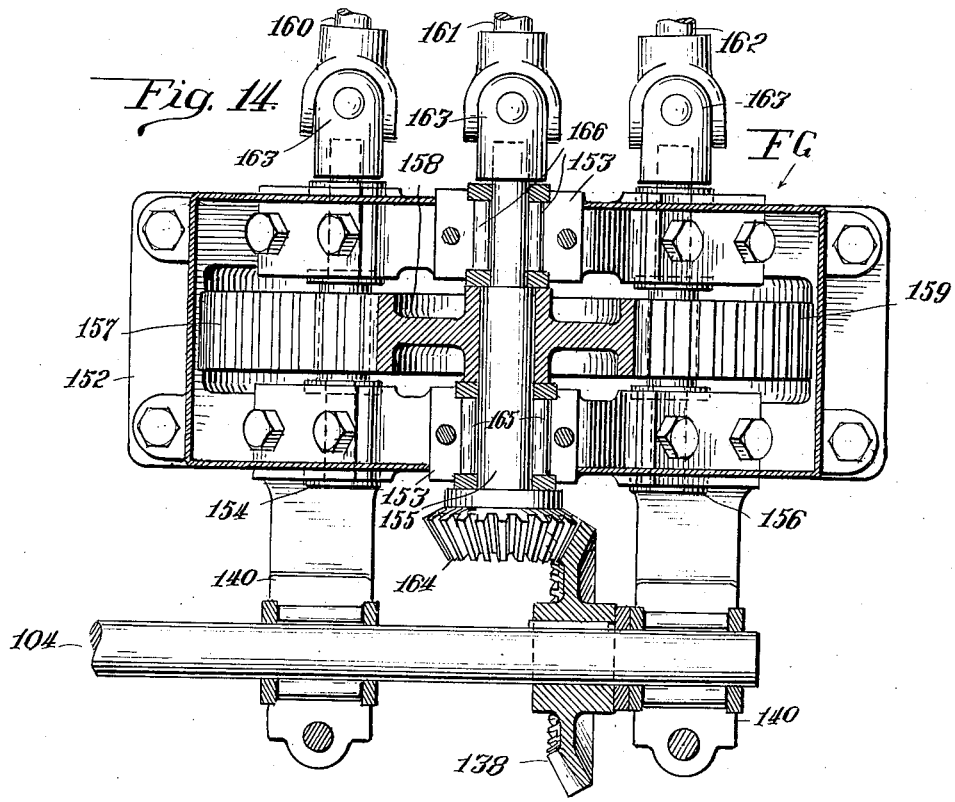
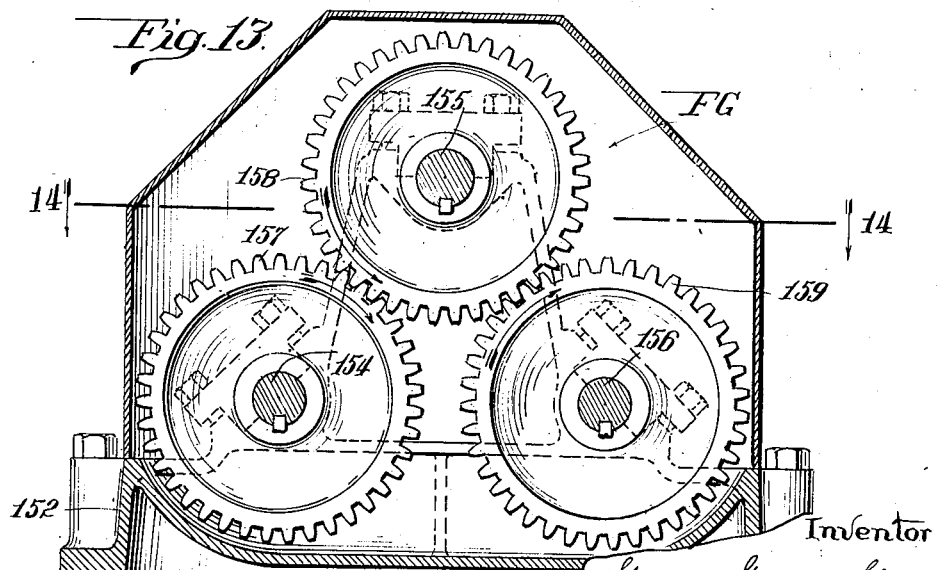

April 20, 1937.                G. G. LLOYD                2,078,005
                    MILL PLANT FOR ROLLING HOT METAL
                        Filed Dec. 26, 1934           7 Sheets-Sheet 5
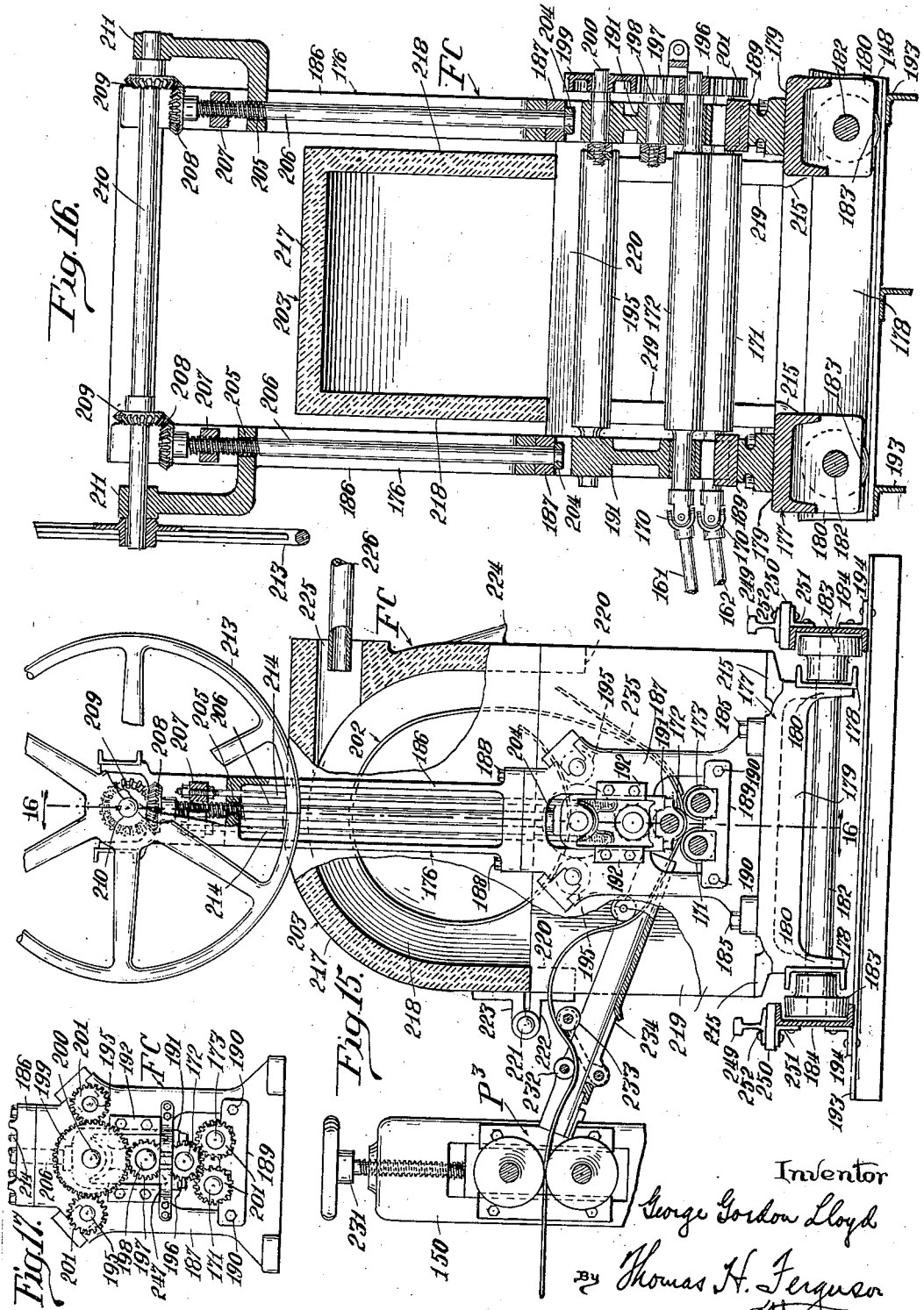

April 20, 1937.　　　　G. G. LLOYD　　　　2,078,005
MILL PLANT FOR ROLLING HOT METAL
Filed Dec. 26, 1934　　　7 Sheets-Sheet 6
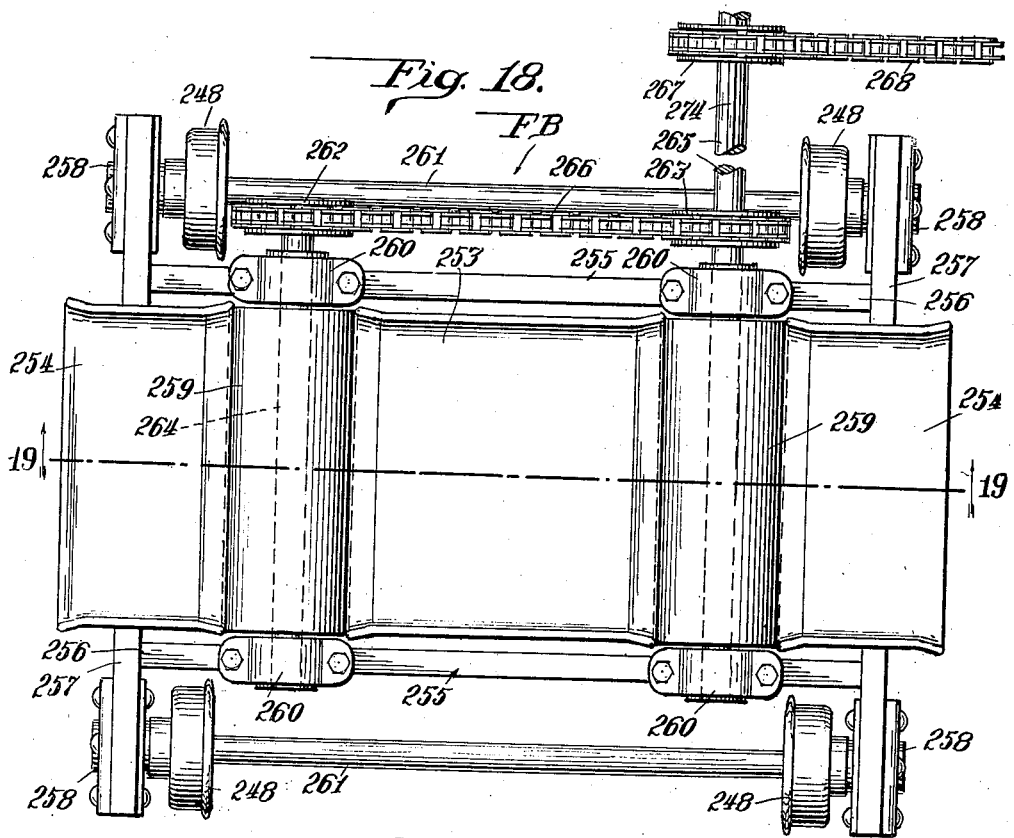
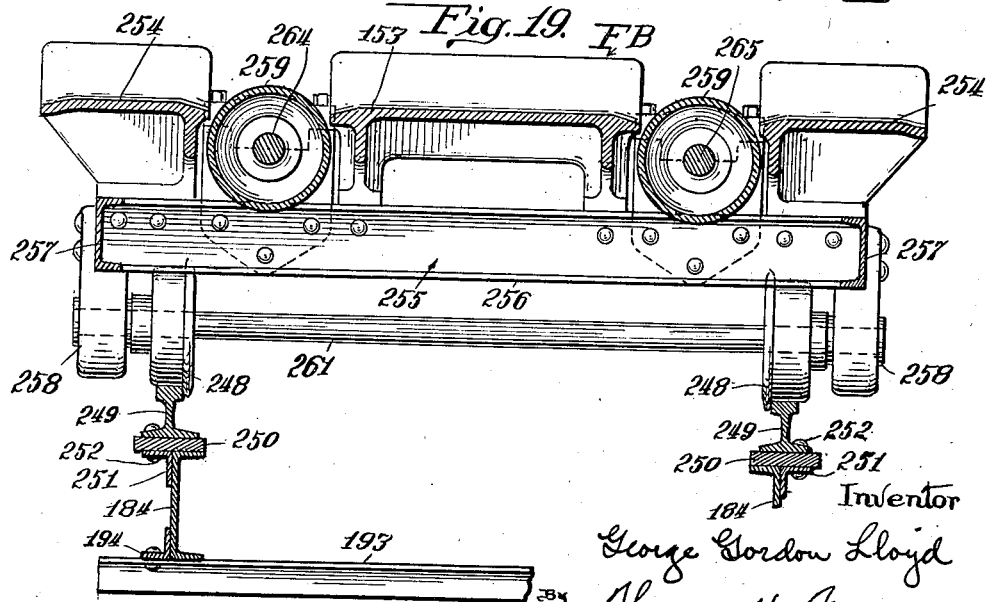
Inventor
George Gordon Lloyd
Thomas H. Ferguson
Attorney April 20, 1937.  G. G. LLOYD  2,078,005
MILL PLANT FOR ROLLING HOT METAL
Filed Dec. 26, 1934  7 Sheets-Sheet 7
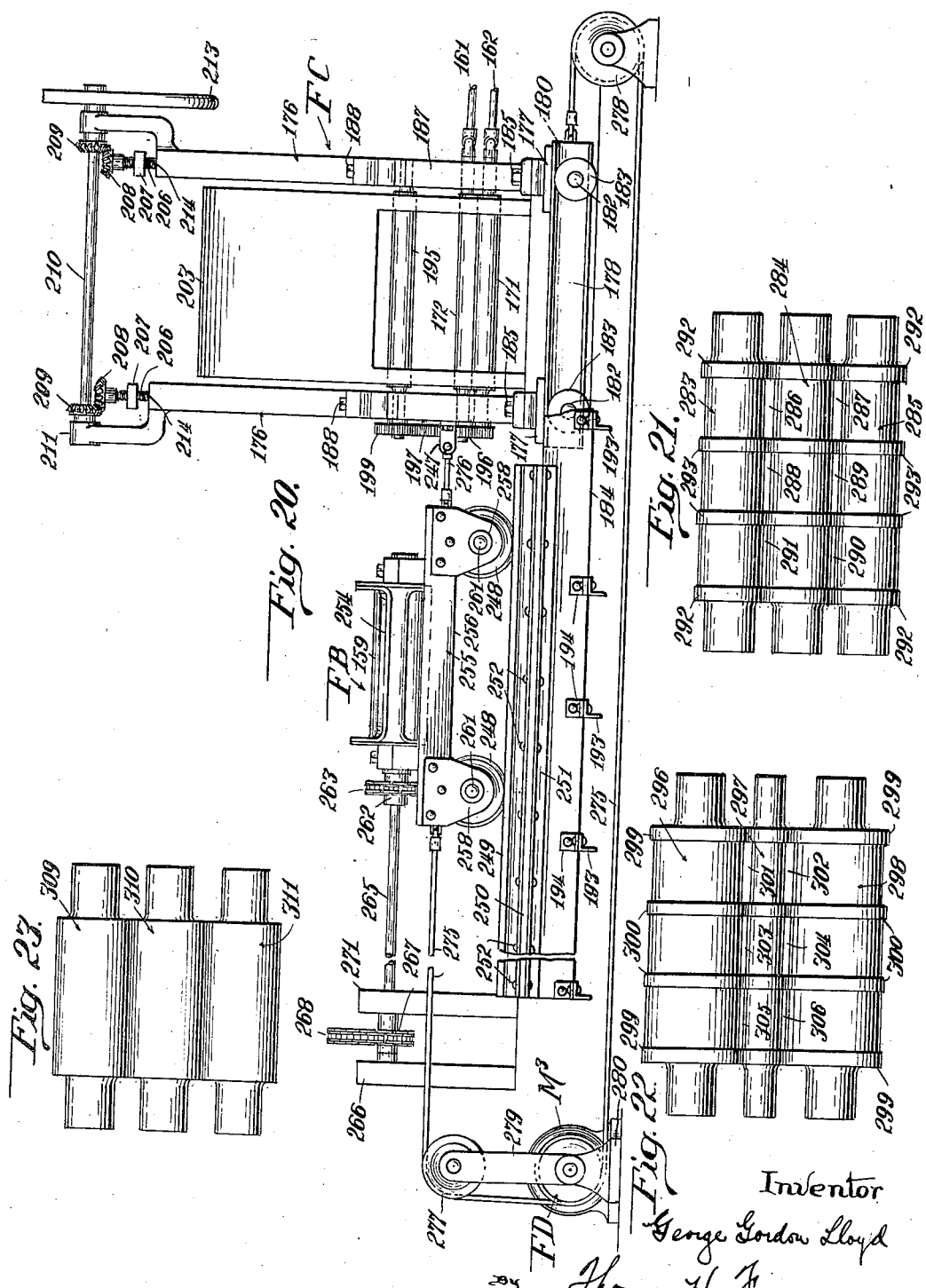

Patented Apr. 20, 1937

2,078,005

UNITED STATES PATENT OFFICE 2,078,005

MILL PLANT FOR ROLLING HOT METAL

George Gordon Lloyd, Youngstown, Ohio, assignor of one-twentieth to W. C. Coryell, Youngstown, Ohio Application December 26, 1934, Serial No. 759,142

36 Claims. (Cl. 80—32)

The present invention relates to rolling mill plants for treating hot metal and particularly hot metal strip. Although certain features of the invention are capable of use in other connections than in connection with the rolling of strip yet the invention will be illustrated and described as embodied in a strip mill in order to have in view a definite embodiment of the invention.

The principal object of the invention is to provide a mill plant which will have greatly increased efficiency over prior art plants for doing the same work. This means that for a given production my new plant will cost less to build and install, or, with a given cost, my plant will have a larger output. In other words, I aim to provide a strip mill capable of producing more strip per dollar invested than any strip mill of the prior art and to provide an extremely flexible mill capable of producing a wide range of widths on the same mill without necessitating roll changes or lowering the efficiency of the mill.

To this end I provide a novel arrangement of mill stands and coilers and use them in a new way in the handling of the strip.

I also employ a new heat conserving coiler. This coiler is arranged to hold the heat of the hot metal of the strip which is rolled upon it. And, if desired, additional heat may also be supplied to the coil enclosing chamber.

For the initial passes of the rolling strip I employ a feed table of novel construction. This table is provided with a removable section which may be displaced with reference to the other parts so as to make room for a coiler.

In the operation of the new arrangement the metal is not always passed back and forth through the mill passes so as to extend out over long tables but at certain times the hot strip is passed to a coiler upon which it is coiled for transference to a new position or otherwise as may be desired.

Viewed in another way, a roughing mill and feed tables are used to treat the metal when too stiff to coil and then when sufficiently reduced, coilers replace the feed tables and take up the strip as it passes back and forth through other mill passes, such as those of a finishing mill.

The shifting of the coiler to occupy loading, unloading or other positions also requires new drives for the coiling elements of the coiler.

Again, in order to produce more even ends upon the finished strip, and also better edges, I also employ roughing rolls which are cut in such a way as to give the strip as it travels through the passes of the mill a cross-section in which the edges are much thicker than the intervening portion. As the strip is reduced these relations are maintained for a number of passes and then the strip is finished into a cross-section of substantially uniform thickness throughout.

Another feature resides in coiling the strip with its ends always at the centers of the coils while applying or conserving heat so as to regulate the temperature of the strip. Heat is preferably applied to a heat insulating enclosure for the coil both before and after the coil is formed therein.

Still another feature resides in the use of a novel roll drive employing slip clutch means. This drive allows an improved product by permitting one of two or more rolls to ride free and yet prevents injury to the equipment by positively driving in case any condition arises which would tend to stop the roll capable of the free travel under normal conditions.

The various features, objects and advantages of the invention will be more fully understood upon reference to the following detailed description and accompanying drawings, wherein a hot strip mill plant is described and illustrated as a preferred embodiment of the invention, while for a measure of the scope of the invention reference should be had to the appended claims.

In said drawings, Fig. 1 is a diagrammatic plan view illustrating a rolling mill plant for use in rolling hot metal strip, the plant being constructed and arranged in accordance with the present invention. Fig. 2 is a central section through the roughing mill, the plane of section being indicated by the line 2—2 of Fig. 1. Fig. 3 is a similar section through the finishing mill, the plane of section being indicated by the line 3—3 of Fig. 1. Fig. 4 is a plan view of the motor drive of the mill rolls. Fig. 5 is a rear elevation of the mill and drive. Fig. 6 is an elevation illustrating the passes of the rolls of the roughing mill. Fig. 7 is a partial sectional elevation of one of the rolls of the finishing mill. Fig. 8 is a transverse section through the telescopic shafts which drive the parts of one of the coilers, the plane of section being indicated by the line 8—8 of Fig. 1. Fig. 9 is a partial sectional view of one of these shafts, showing the keyed connection which allows free longitudinal movement. Fig. 10 is a sectional view of reversing gearing associated with the mill and coilers, the plane or section being indicated by the line 10—10 of Fig. 1. Fig. 11 is a transverse sectional view of the same, the plane of section being indicated by the line 11—11 of Fig. 10. Fig. 12 is a partial sectional view of another portion of the same gearing, the plane of section being indicated by the line 12—12 of Fig. 1. Fig. 13 is an end view of one set of gears having to do with the driving of a coiler, the casing over the gearing being shown in section, the plane of section being indicated by the line 13—13 of Fig. 1. Fig. 14 is a horizontal sectional view of the same gearing, the plane of section being indicated by the line 14—14 of Fig. 13. Fig. 15 is an end elevation of one of the heat conserving coilers and associated pinch rolls, part of the insulating enclosure being broken away. Fig. 16 is a partial sectional view of the same, the plane of section being indicated by the line 16—16 of Fig. 15. Fig. 17 is an elevation of the coiler viewed from the right as the parts are seen in Fig. 16. Fig. 18 is a plan view of one of the bridging sections of the feed table associated with the roughing mill. Fig. 19 is a central vertical section of the same, the plane of section being indicated by the line 19—19 of Fig. 18. Fig. 20 is a side elevation of a bridging section and an associated coiler and other parts illustrating particularly the way in which the bridging section and coiler are moved to and fro relative to the loading and unloading positions before the roughing and finishing mills. Fig. 21 is an elevation of modified roughing rolls, there being six passes shown. Fig. 22 is a similar view of modified finishing rolls, also showing six passes. And Fig. 23 is a similar view of three-high finishing rolls, providing only two passes and being free of collars. Throughout these views like characters refer to like parts.

In order to obtain a general idea of the structure of the plant, the various parts may be briefly referred to while examining more particularly Figs. 1, 2, 3 and 4 of the drawings. As there shown, there is a roughing mill RM and a finishing mill FM located end to end. In line with the roughing mill passes are the front table FT and the rear table RT. The table FT is adjacent to the furnace F and is positioned so as to receive the work directly from the furnace. Associated with the table FT is an edger E. The strip as it travels along the table FT may be passed through the edger as desired to give the strip a proper width and edge treatment.

As the strip advances along the feed table FT, it passes over a front bridge FB, which normally closes a gap in the table FT, and continues on to the roughing mill RM. As the piece approaches the mill, it passes through a pair of pinch rolls $P^1$. On leaving the mill RM the piece passes over the rear bridge RB of the rear feed table RT. When the piece has completed its course through the first pass of the roughing mill RM, it is returned through the rear pinch rolls $P^2$ and on through the second pass of the mill RM. At such time the work may be passed over the top of the edger E along the table FT. A return of the strip is then made through the third pass of the mill RM and finally it is brought through the fourth pass. At this time it is not allowed to pass over the table FT but is coiled up on the front coiler FC, this coiler having been moved by the front drum FD so as to replace the bridge FB in the path of travel of the work.

After the work has been coiled up by the coiler FC, then the latter is moved back into its position in line with the finishing mill FM. At the same time the bridging section FB is also brought back into line with the main portion of the table FT. When the front coiler FC is in proper position before the finishing mill FM, then the end of the coiled work is passed between the pinch rolls $P^3$ and on through the first pass of the finishing mill FM. As it emerges from the latter it is passed into the rear coiler RC and wound into a coil therein. From the coiler RC the work is then forwarded through the rear pinch rolls $P^4$ and on through the second pass of the mill FM and is again coiled up on the coiler FC. If there be but two passes in the finishing mill, then this operation completes the operations on the work and leaves it as a coiled finished strip. The coil is then removed from the coiler FC.

Obviously the particular course pointed out need not be followed in every instance. It will be apparent that the number of passes in the different mills might be other than indicated and the coilers might be brought into operation at different times. In some instances the rear coiler RC would be the first one to wind up the strip. When so used, the movement of the coiler RC into the bridge gap would follow the displacement of the rear bridge RB from its normal position, which displacement would be brought about by the rear drum RD and the associated connections.

The various parts of the plant may be driven in various ways. In the illustrated embodiment, the front table is driven by motor $M^1$, the rear table by motor $M^2$, the front coiler shifting drum by motor $M^3$, the rear coiler shifting drum by motor $M^4$, the main mill by the main motor $M^5$ and the edger by a motor $M^6$. A suitable gear train GT acts between the main motor and the mill rolls. At the other end of the aligned rolls, a reversing gear RV is employed to control the direction of rotation of the coilers and pinch rolls which derive their power from the adjacent mill rolls through front and rear gear boxes FG and RG, associated with suitable shafting. Having given this general view of the plant and its operation, attention may now be directed to the details of the various mechanisms.

The roughing mill RM and finishing mill FM may be of any desired construction. These mills together with the driving arrangements shown are merely typical. In the case of the roughing mill, the housings 30 are mounted upon supporting shoes 31 and maintained in spaced relation by suitable separators 32. Screw-down mechanisms 33 are also associated with each housing and operate upon the roll bearing boxes as usual. The roughing rolls 34, 35 and 36 are suitably mounted in the housings 30. As here shown, they are provided with cylindrical contacting surfaces in the form of end collars 37, and intermediate collars 39. As usual, the various end and intermediate collars on the three rolls engage each other during the operation of the rolls and provide passes for the material being worked upon. These passes include a first pass 46 between the rolls 34 and 35, a second pass 47 between the rolls 35 and 36, a third pass 48 between the rolls 34 and 35, and a fourth pass 49 between the rolls 35 and 36. As clearly shown in the same figure, the pass 46 is larger than the other passes, the pass 47 is next in size, the pass 48 is still smaller, and the pass 49 is the smallest of the series. It will be noted that the roll surfaces which provide these passes are not cylindrical but are curved in longitudinal contour so that each pass has an enlarged space at each end. Thus, in the case of the pass 46, there are the enlarged end portions 50; in the pass 47, the somewhat smaller enlarged portions 51; in the pass 48, the still smaller bulbous portions 52; and in the pass 49, the bulbous portions 53 which are the smallest of the series. The screw-down mechanisms 33 are, of course, merely used to hold the roll bearings so that the various cylindrical portions will operatively engage each other throughout the complete rotations of the rolls and thus maintain the passes 46, 47, 48 and 49 exact.

With this arrangement, the hot metal strip, after being given a proper width by the edger E comes to the pass 46 and is put through it with the result that the strip is shaped in cross-section like the pass and has therefore thickened edges. As the metal passes through the pass 47, the thickness of all portions of the strip are further reduced. When the third pass 48 is reached, the strip, having been narrowed down previously by passage through the edger, is given a somewhat different cross-section, viz., one which is a little thicker in the middle and not quite so bulbous at its ends. In the final passage, through the fourth pass 49, the metal strip is still further reduced in thickness and the edges brought to a thickness but slightly greater than that at the center. Thus, the strip, as it emerges from the fourth pass closely approaches a flat strip. The passing of the strip during its reduction through these thick-edge producing passes of the roughing mill avoids strains in the edges as there is a natural tendency for the metal to elongate more at the edges than in the middle. By thus increasing the draft upon the edges in each succeeding pass, the strip is brought gradually into complete alignment and split or cracked edges or laminated edges are avoided. Of course, in some types of metal, stresses in the strip need not be avoided. Skelp is an example. Therefore, in such cases flat passes may be used, if desired.

As we shall see later, the strip goes from this last roughing pass into the passes of the finishing mill FM and is there reduced to size. The number of roughing passes used may be different than just described. In some instances, only three of the passes shown may be used. In other instances, the rolls may be differently divided in length so as to give more passes. The number of roughing passes used, however, is always such as to reduce the strip sufficiently to permit coiling. Usually, it is put through four or five passes and then it is coiled and transferred to the finishing mill.

When we come to the finishing mill FM, we have a metal structure similar to the mill RM. Here, there are housings 56, separators 57 and screw-down mechanisms 58. There are also three rolls 59, 60 and 61. The rolls in this case are cylindrical throughout and the center roll 60 is of smaller diameter than the upper and lower rolls 59 and 61. The screw-down mechanisms 58 are used, as usual, to position the reducing rolls so as to keep their engaging collars in operative contact throughout the successive roll rotations. In the instance illustrated, the rolls have only two collars 62 each. The larger pass is the pass 63, between the rolls 59 and 60, and the smaller pass is the pass 64, between the rolls 60 and 61. Obviously, when the strip of metal leaves the roughing mill RM and is brought to the finishing mill FM it is first put through pass 63 which reduces the thickness of the strip over what it was upon leaving the fourth pass of the roughing mill. The second pass 65 still further reduces the thickness of the strip and increases its length.

When it comes to the drives for the mill rolls, two sets of pinions are preferably used in association with suitable driving spindles as is usual in rolling mill practice. One set of pinions includes three pinions and the other set two pinions.

In the three pinion set there are suitable pinion housings 67 which are properly mounted upon the base shoes 31 and held in spaced relation by separators 68. The pinions of this set are three in number and include an upper pinion 69, an intermediate pinion 70 and a lower pinion 71. Driving power is applied to the central pinion 70 through a spindle 72. The three spindles are connected respectively to the three roughing rolls 34, 35, 36 by spindles 73, 74 and 75. The finishing mill rolls 59 and 61 are driven directly from the roughing rolls 34 and 36 through the agency of spindles 76 and 77. In order to apply power to the central finishing roll 60, a special slip clutch construction is employed. This is located in the roll 60, or pinion, or spindle.

The two pinion set includes housings 78 mounted upon the base 31 and properly spaced by one or more separators 79. The pinions 80 and 81 are suitably journaled in the housings 78 and intermesh. The pinion 81 is driven directly from the lower finishing roll 61 through the agency of a spindle 82. The intermediate finishing roll 60 is in turn driven from pinion 80 through the agency of a spindle 83.

The finishing roll 60 is the roll which employs the slip clutch mechanism as before noted. This mechanism is identical with that disclosed in D. W. Lloyd's United States Patent No. 1,850,510, granted March 22, 1932, for a clutch. This slip clutch arrangement is illustrated more particularly in Fig. 7, and, as there shown, comprises a central shaft or axle 84 and an outer sleeve 85 which carries the finishing roll face and the end collars 62. These parts bear the same relation to each other as the shaft and the sleeve member of the aforesaid United States patent. In Fig. 7, one cooperating spring 86 is illustrated. Springs, like the spring 86 shown, correspond to the springs of said patent.

The lower pinion 81 is driven at a uniform speed, imparted to it by the finishing roll 61 acting through the spindle 82. The pinion 81 then imparts motion to the pinion 80 and the latter through the spindle 83 to the shaft 84 of the roll 60. The latter through the slip clutch action drives the outer strip engaging member 85. The slip clutch arrangement allows the sleeve member 85 to outrun or overrun the shaft or axle 84. In this way the roll 60, that is to say, the sleeve 85 of the roll, adjusts itself readily in peripheral speed to the speed of the work passing between it and the upper roll 59 in the one case and between it and the lower roll 61 in the other case. Put in another way, the slip clutch means allows the central roll sleeve to have the same peripheral speed as the upper and lower rolls whenever strip is being passed through the mill passes. Thus, the speeds of the roll surfaces are equal. The result is friction rolling. A better grade of strip is produced by rolling in this way. There is perfect coordination of the rolls in the stand.

It should be noted that by reason of the clutch arrangement between the axle 84 and the sleeve 85 of roll 60, it is not possible by any jamming of the work to absolutely stop the roll 60. Should an entirely free roll be used, then the roll might be burned at the point of contact with the hot bar with a consequent loss both in cobble and spoiled roll. The use of the clutch insures the parts against such damage. The peripheral speed of the intermediate roll 60 is slightly less than that of the rest of the rolls, say five per cent, that is to say, the driven speed of the slip clutch roll is, say, five per cent slower than that of the other rolls, except when the friction drive is working. The difference in the driven speeds is arranged by having the numbers of teeth in the driving gear wheels differ.

As will be pointed out more fully hereinafter, the power required to drive the coilers and pinch rolls is taken off of the pinions 80 and 81 and given a proper direction of rotation, both forward and back, through the associated reversing mechanism RV.

The power equipment for driving the mill rolls, as before indicated, comprises an electric motor M⁵ mounted upon a suitable base 88 and associated with the gear train GT. The latter includes a suitable frame 89 mounted upon the same base. The frame 89 is provided with bearings for a shaft 91 which is directly connected to the shaft of motor M⁵ through a coupling 92. The shaft 91 is provided with a pair of fly wheels 93 located at its opposite ends. This shaft is also provided with a pinion 94 which is keyed to the shaft and meshes with a gear wheel 95 mounted on an intermediate shaft 96. The latter shaft is also provided with a pinion 97 that meshes with a gear wheel 98 keyed or otherwise suitably secured to a shaft 99. The latter shaft is provided at its outer end with a coupling 100 which is used to connect the shaft 99 with the spindle 72 to drive the central pinion 70 at the roughing mill end of the plant. The gear train GT, including the pinions 94 and 97 and gear wheels 95 and 98, is suitably inclosed in a casing 101 carried upon the base 88. The gearing by which the speed of the motor M⁵ is reduced before being applied to the rolls of the mill, may be varied throughout a wide range. Indeed, any suitable gear mechanism for the purpose will suffice.

As before indicated, the power for driving coilers FC and RC is, in the embodiment of the invention illustrated, derived from the mill drive. As clearly shown, these coilers and the associated pinch rolls are driven from a shaft 104 which extends at right angles to the axis of the mill rolls. As before pointed out, reversing mechanism RV is associated at a point adjacent to the pinions 80 and 81, and operates between the same and the shaft 104, to drive it in forward or reverse directions as may be necessary. The pinion 80 is connected through a spindle 105 to a shaft 106 mounted in suitable standards 107 and 108 spaced apart and suitably secured to a base 109. In like manner the pinion 81 is connected through a spindle 110 to a shaft 111 mounted in bearings in the same standards 107 and 108. The shaft 106 carries a sprocket wheel 112 which cooperates with a sprocket chain 113. The latter engages similar teeth upon a similar but somewhat larger sprocket wheel 114 secured to a sleeve hub 115 mounted for rotation upon the shaft 111. The sprocket wheel 112 has clutch teeth 122 at one end and constitutes a clutch member secured to the shaft 106. Similarly, the hub 115 of the sprocket wheel 114 has clutch teeth 123 at one end and constitutes a clutch member rotatably mounted upon shaft 111.

As clearly shown, these shafts and associated rotary parts are provided with roller bearings. Thus, in the case of shaft 106 there are the rollers 116. Again, the hub member 115 is provided with rollers 117 in its bearing within the member 108. Furthermore the interior of the hub member 115 is provided with rollers 118 and 119. In a similar way the mounting of the shaft 106 in the bearing member 108 may be provided with a roller bearing 120 and in like manner the shaft 111 is provided with a roller bearing 121 where it is mounted within the member 108.

Cooperating with the clutch teeth 122 on the pinion 112 and the clutch teeth 123 on the hub member 115 are the toothed clutch members 130 and 131. The clutch member 130 has feathered connection with the shaft 106 so that it may be moved longitudinally thereof to bring its clutch teeth into and out of engagement with the clutch teeth 122 on pinion 112. In like manner, the clutch member 131 has feathered connection with the shaft 111 and is movable longitudinally thereof to engage with and be disengaged from the clutch teeth 123 of the hub member 115 which carries the sprocket wheel 114. The member 130 is provided with a peripheral slot 124 in which projections 125 on a fork 126 on a clutch lever 127, are free to travel as the clutch member 130 rotates with the shaft 106. In like manner, a groove 128 cooperates with projections 129 upon a second fork 132 formed on the same clutch lever 127. The lever 127 is supported by a pivot pin 133 which is secured to two projections 134 extending laterally from the bearing member 108.

Since the pivot pin 133 is positioned between the forks 126 and 132, it follows that, when the lever 127 is moved, the members 130 and 131 move in opposite directions. Thus, viewing the parts as they appear in Fig. 10, if the lower end of the lever 127 be moved to the right, then clutch member 130 will be thrown into clutching engagement with the sprocket pinion 112 and the clutch member 131 will be thrown still further away from engagement with the member 115. On the other hand, if the lower member of the lever 127 be moved to the left, then the upper clutch member 130 will be thrown out of clutching engagement and the lower clutch member 131 will be thrown into clutching engagement.

It therefore follows that since the spindles 105 and 110, connecting with the pinions 80 and 81, respectively, rotate in opposite directions, then, when the clutch member 130 is in clutching engagement with pinion 112, the hub 115 will be rotated in the same direction as the spindle 105. On the other hand, if the clutching connection be established through clutch member 131, then the direction of rotation of the spindle 110, which was opposite to that of spindle 105, will be transmitted directly to the hub 115, and consequently the latter will be rotated in the same direction as the spindle 110 and in the opposite direction to the spindle 105.

The outer end of the hub 115 which is really a sleeve of considerable length, is provided with a beveled gear pinion 136. The latter may be rotated in either direction by a simple throwing of the clutch lever 127 as just explained. The beveled pinion 136 meshes with and drives a cooperating pinion 137 on the shaft 104 which it will be remembered is the shaft through which the coilers and pinch rolls are operated. This shaft carries additional bevel gear wheels 138 for operating the coilers and similar gear wheels 139 for operating the pinch rolls. These pinions are all secured to the shaft 104 which is suitably journaled in bearings formed in supports 140 which in the present instance are carried by a structure of metal channels 141, 142 suitably secured to a transverse channel iron 143. The latter structure is shown more particularly in Fig. 12 and it will be seen that the member 143 which extends in a direction substantially parallel to the shaft 104 supports a bearing member 144 for a pinch roll shaft 146. In the case shown in Fig. 12, the shaft 146 is that associated with the pinch rolls P² and P⁴, that is to say, the pinch rolls on the rear side of the mill.

As clearly shown, the shaft 146 is provided with a beveled gear wheel 147 which meshes with the adjacent bevel gear wheel 139 on the shaft 134. As the shaft 104 is rotated, the shaft 146 is also rotated to actuate the pinch rolls. The latter shaft may be that shaft which carries either the upper or the lower one of the pinch rolls of each pair. For certainty of illustration, the shafts 146 are shown as the shafts of the lower rolls of the four sets of pinch rolls P¹, P², P³ and P⁴. The shaft 146 associated with pinch rolls P¹, P² is journaled in suitable bearings in supporting members 150. Similarly, the shaft 146 associated with the pinch rolls P³, P⁴ is journaled in bearings in supporting members 151.

As before noted, the coilers FC and RC are both driven from the shaft 104. In each instance there is a gear box employed, in one instance the gear box FG and in the other the gear box RG. In Figs. 13 and 14 the detailed structure of one of these boxes is shown. The structure is that of the front gear box FG. This box is provided with a frame structure comprising a base 152 and two spaced uprights 153. The latter are provided with bearings for shafts 154, 155 and 156. To these shafts are keyed three intermeshing gear wheels 157, 158 and 159, respectively. The ends of these three shafts extend beyond the base 152 and are connected to corresponding shafts 160, 161 and 162 by universal joints 163 which are identical in the three cases. The shafts 160, 161 and 162 are extended from the gear box to the adjacent coiler. In the case under consideration these shafts extend to the moving parts of the front coiler FC. Power is transmitted from the shaft 104 to the shaft 155 through the associated bevel gear wheel 138 and a cooperating bevel pinion 164. It will be seen that the rotation of the shaft 104 in either direction will be instrumental in driving the three shafts 160, 161 and 162 in corresponding directions. Thus, if the shaft 104 be rotated so as to move shaft 155 counter-clockwise, as the parts are viewed in Fig. 13, then the shafts 154 and 156 will be moved clockwise. This means that the shaft 161 will be moved counter-clockwise and the shafts 160 and 162 moved clockwise. With the driving shaft 104 operating in the opposite direction, then the three shafts of the sets mentioned would be oppositely rotated. The shaft 155 is shown mounted in roller bearings 165 and 166. It will be understood that similar roller bearings may be employed for the shafts 154 and 156.

The shafts which extend from the gear box FG to the front coiler FC, that is to say, the shafts 160, 161, 162, are telescopic. This telescopic construction is provided since the coiler box FG is fixed in location and the coiler FC is mounted so as to be shifted back and forth upon supporting rails and driving connection must be maintained in all positions of the coiler. The telescopic construction of the shafts may take any one of a number of different forms. In the present instance, as shown more particularly in Figs. 8 and 9, each shaft is provided with a central shaft member 167 and an outer sleeve member 168. These are provided with longitudinal feathers 169. Each feather may be fixed in the inner member 167 and reciprocate in a slot in the outer member 168 or vice versa. It will be seen that, with the arrangement shown, the two parts of the shaft will move together when rotating, and it will also be seen that the two parts may be extended or forced together in telescopic fashion in order to provide different shaft lengths. When the coiler is in the position illustrated in Fig. 1, then the shaft parts 167 and 168 will be most completely telescoped. When the coiler is in position to receive from the roughing mill RM then the telescopic shaft parts will be most fully extended. As clearly shown in Fig. 16, the shafts 160, 161 and 162 are connected through other universal joints 170 with the coiler rollers 171, 172 and 173, respectively. This brings us to a consideration of the coiler and its operations.

The front coiler FC will be described in detail, it being unnecessary then to describe the rear coiler RC, since both coilers are the same except that certain parts are reversed as clearly indicated in Fig. 3. The coiler FC comprises two upright frames or housings 176 mounted upon a base frame 177 consisting of longitudinal members 178 and transverse members 179. At the four corners of the frame 177 are depending projections 180 which preferably are extensions of the transverse members 179. These projections 180 have the longitudinal members 178 secured to them and both are apertured where they overlap to provide bearings for wheel axles 182. Each axle carries two flanged wheels 183, one at each end of the axle. These wheels travel in a coiler track made up of channels 184 which have their flanges extending toward each other. In this way the frame 177 and all that it carries is free to travel to and fro in the direction of the channel irons 184, said direction being substantially parallel to the axis of the mill stands. The coiler track has its channel rails 184 carried upon angle irons 193 which constitute rail ties. Tie plates 194 serve to secure the rails to the ties. All these parts being metal may be secured together in any suitable way, as, for example, by electric welding.

It will be apparent that the upper flanges of these angle rails 184, which normally are but a short distance above the wheels 183, will engage the latter in case the coiler should be pulled upon in the feeding or withdrawing of the strip so as to tilt it and thus raise the wheels 183 on the one side out of engagement with the lower flanges of the rails and into engagement with the upper flanges. This action of the rails upon the wheels flanges gives strength to the coiler and its mounting without giving the coiler itself great weight, such as would be required to keep it resting upon standard railroad rails.

The coiler frame uprights 176 are secured to the base 177 in any suitable way as by means of bolts 185. As shown, the uprights 176 comprise upper sections 186 and lower sections 187 which are secured together by bolts 188. The sections 187 support bearings for the journals of the rolls of the coiler. As shown, the rolls 171 and 173 have their journals in boxes upon transverse members 189 secured to the members 187 by bolts 190 or the like. Similarly, additional bearing members 191 are mounted for vertical adjustment within the respective housing members 187. Guides 192 are bolted to the members 187 on either side of each member 191. These members 191 also provide bearings for the journals of the roller 172. The holding rollers 195 are likewise journaled at their ends in said bearing members 191. As clearly shown, these rollers 195 are spaced apart and form a support for the coil of strip as the same is coiled up by the three coiling rollers 171, 172 and 173.

As previously noted, the three coiling rollers 171, 172 and 173 are driven by the telescopic shafts 160, 161 and 162 through the universal joint connections 161 at one end of the coiling rolls. At the other end of these coiling rolls, there is a train of gears arranged to drive the holding rollers by power received through the upper bending roll 172. This train of gearing includes a pinion 196 secured to the end of the roller 172. The pinion 196 coacts with an intermediate gear wheel 197 which is secured to a stud shaft 198 suitably mounted in the adjacent bearing member 191. The gear wheel 197 in turn meshes with a somewhat larger gear wheel 199 which is likewise journaled on a stud shaft 200 mounted in the same bearing member 191. The gear wheel 199 in turn meshes with two gear wheels 201 mounted upon the ends of the holding rollers 195. The latter wheels 201 are not necessary to the driving of the forming rolls 171 and 172 but will serve as an additional means to keep them traveling uniformly and steadily.

It will be seen that with the various rolls and rollers arranged and driven as shown, the strip, as it passes through the coiling rolls, will be given a set which will change its direction of travel and cause it to move upward and form into a coil above the holding rollers. In other words, the forming rolls give the strip a definite curvature, then the strip as it is shoved forward coils itself. A strip 202 is shown in the process of forming a coil. This strip may be readily started through the coiling rolls 171, 172 and 173 and when once started will freely travel upward within the housing 203 and within the latter continue in its spiral travel and come into engagement with the holding rollers 195 which will substantially support the forming coil as it moves. A centerless coil is thus produced.

The gear train through which the holding rollers 195 are driven will cause these rollers to travel in a direction agreeing with that required for the formation of a coil. Thus, if we view the parts as shown in Fig. 15, and assume that the strip 202 is being fed in the direction indicated by the arrow, then rollers 171 and 173 will rotate clockwise and roller 172 will rotate counter-clockwise. These directions will be in accord with the direction of travel of the strip through these forming rolls and tend to advance it. Following out the directions of the different wheels of the train of gearing it will be found that in the assumed case, the holding rollers 195 will both be rotated clockwise. This will be in proper direction to carry forward the strip in the formation of the coil contacting these rollers. And, as this is true for the front coiler FC it will also be true for the rear coiler RC, should the latter be unwinding while the front coiler is coiling.

In order to hold the bearing members 191 in proper position in housings 187, a suitable screw-down mechanism is provided. This mechanism includes two vertical shafts 206 which are journaled at their lower ends in thrust bearings 204 formed in the housing members 186. These shafts extend freely through guide openings 205 in the housing members 186 and have their upper ends threaded for the reception of apertured heads 207 which act as nuts and travel up and down in response to rotations of the shafts 206. The heads 207 are respectively connected by rods 214 to the bearing members 191, two such rods for each member. As a result of this construction a rotation of the shafts 206 will cause up and down movement of the bearing members 191 and the associated boxes. In this way the mountings of the different rolls and rollers may be readily adjusted. When loosened up, the various rollers may be removed or otherwise worked upon, as may be found necessary for replacement or repair.

The screw rods 206 are preferably operated in unison as is customary in screw-down mechanisms. Accordingly the upper ends of the rods 206 carry bevel gear wheels 208 and these mesh with other gear wheels 209 secured to a transverse shaft 210, suitably journaled in arms 211 projecting from the housing frames 186. A hand wheel 213, on one end of the shaft 210 enables the shaft 210 to be rotated by hand. As a result, the rods 206 are rotated with the results just described.

Obviously, the screw-down mechanism may be operated to raise the bearing members 191 whenever it is necessary, as may be the case when first introducing the end of the strip into position between the forming rolls 171 and 172 and the rolls 172 and 173. Once started, the members 191 may be lowered, that is to say, the roll 172 may be lowered and the positioned strip end bent and started in its coiling path.

The heat retaining hood 203 is formed with a semi-circular top 217 and vertical ends 218 which are substantially parallel. This structure provides an inner curved surface for the end of the strip to engage, in case it has not been given sufficient set as it passes through the coiling rolls 171, 172 and 173. In other words, the shape of the roof 217 conforms to the general outline of the coil as the latter is being formed. This hood 203 may be variously constructed but must be made of heat resisting material such as fire clay or the like. This hood, which constitutes an insulating enclosure, may be mounted in any desired way upon the frame structure, provided only that it be so located as to properly receive the strip to permit of the forming of the coil. Thus, the hood 203 itself may be mounted upon end walls 219 constructed with material of the same heat resisting properties. When so constructed, the front and rear of the enclosing casing, below the hood 203, are open for entry of or access to, the strip, the rolls, rollers, guides and other parts.

During the operation of the coilers where the strip is alternately coiled up, first in one coiler and then in the other, the temperature of the ends of the strip is maintained fairly constant, inasmuch as the ends are alternately coiled up into the center of the coil. Thus, for example, when the strip is coiled up in coiler FC, its front end will be in the center of the coil and its rear end on the outside; again, when the strip is coiled up in coiler RC, its rear end will be in the center of the coil and its front end on the outside. Thus, the ends are alternately coiled in the center of the coil and heat is given each end by the hot central portion of the strip. This alternate heating of the strip ends gives the strip a very even temperature throughout, with the result that the strip receives an even gauge throughout, and roll breakage caused by cold butt ends is eliminated. This accurate control of the temperature of the strip throughout is a very important advantage which is obtainable with the plant herein disclosed.

Preferably the upper end of the walls 219 are connected by transverse frame members 220 which will form a supporting frame structure which will allow the hood 203 to be tilted about pivot pins 221 passing through hinge members 222 on the supporting frame structure and cooperating hinge members 223 on the hood 203. The opposite side of the hood is provided with a nub 224 having a flat under surface such that a bar or the like may be engaged under the same and forced upward to help start the hood in its movement of rotation about the hinge pins 221. The box is swung up about its hinges and maintained there while the coil is rolled out upon a suitable support.

The side walls 219 joined at their upper ends by the transverse members 220 form a sort of box like base for the hinged hood which rests upon the coiler carriage frame 177, the transverse members 179 having projections 215 which together with the main body of the members 179 provide a suitable support for this insulating base.

Preferably the hood 203 is provided with an opening 225 into which a pipe 226 may be inserted for the purpose of supplying gas to the interior of the hood, the gas being used as a fuel to increase the temperature within the hood. Obviously, the hot metal itself will radiate heat and the nature of the material of the hood is such that the strip coiled up within it will be kept at a reasonably high temperature by the heat coming from the coil itself. If desired, when in service the auxiliary heat supply may be omitted and the opening 225 closed by a stopper or other means manually, or otherwise, applied. In the instance illustrated, the pipe 226 is portable and may be removed when it is not desired to use auxiliary heat. In regular practice, the box 203 is heated before the strip enters and after it leaves, alternately, and thus that temperature within the hood is maintained which will best suit the requirements of the job in hand.

Through heat control in the hot box or hood 203, it is possible to control the scale formation on the strip, thus giving the customer the type of scale best suited to the case in hand. Thus, steel strip which is to be pickled or oiled should have a tight red scale. Strip which is to be cold rolled should have a loose gray scale. These can be readily obtained through the use of the hood 203.

The coilers may be variously operated. Sometimes they will be used quite regularly taking up the strip after each finishing mill pass while at other times the coiling may be omitted for one or more passes to give the metal a chance to cool. This may be necessary in rolling some grades of steel strip, for example, some requiring to be rolled much colder than others. Again, the last coiling operation might be omitted and the strip delivered directly to a hot bed to be cut to specified lengths.

The strip 202 on its way to the coiler FC is ordinarily passed between the pinch rolls P³ which, as clearly shown in Fig. 15, are provided with a screw-down 231 associated with the housings 150.

The strip after passing between the pinch rolls P³ may be variously guided so as to be properly presented to the forming rolls 171, 172 and 173. In the present instance the strip is shown as passing beneath a guide roll 232 and over a guide roll 233. These rollers are mounted in suitable bearings upon a chute 234 which extends from the pinch rolls to the point of entrance to the coiler forming rolls. A curved guide, such as the guide 235, may also be employed to engage the strip as it leaves the bending rolls and direct it in its curved spiral path.

Since the bridge FB, associated with the roller table FT, is moved to and fro with the associated coiler FC, it will probably be well to consider next the construction of the roller table FT and its associated bridge. The table FT, when considered independently of its removable bridging section FB, may be variously constructed. In the present instance, the bridging structure FB comprises a suitably supported frame having side members 237, 238 between which are located a series of table sections 239. These sections are positioned at the same level and spaced apart for the interposition of rollers 240. The upper surfaces of the rollers 240 extend slightly above the plane of the top surfaces of the table sections 239 and these rollers are actuated to advance the work as it is received upon the table.

Each roller 240 is provided with a shaft and a bevel gear wheel 241 at the end adjacent to the frame member 238. Each of these bevel gear wheels 241 mesh with a cooperating gear wheel 242 mounted upon the drive shaft 243 which extends along the member 238 and is journaled in suitable supports as is usual in tables of this sort. The shaft 243 is driven by an electric motor $M^1$ through a suitable sprocket chain 244 or the like.

It will be apparent that when a strip of metal is placed upon the table FT, and the rollers are started in movement, the strip will be carried along in a direction depending upon the direction of rotation of the rollers. The motor $M^1$ is such that it may have its direction of rotation reversed in order to reverse the direction of rotation of the rollers 240, to move the strip toward or from the associated mill RM. The portion of the table FT opposite the furnace F is provided with a buffer or guide 245 against which the strip may be moved when positioning it upon the roller table. This guide may be variously constructed as may be desired. It is merely diagrammatically illustrated in the present case.

Now, coming to the bridge section FB forming part of the same roller table, it will be noted that this portion of the table, so clearly shown in Figs. 18 and 19, is mounted on flanged wheels 248 adapted to travel upon standard railroad rails 249. The latter are mounted upon strips 250 which extend lengthwise of the coiler tracks 184 associated with the supporting wheels 183 of the coiler FC. The relation of the rails 249 and 184 is shown more particularly in Figs. 15 and 18. On the under side of the strips 250 are angle plates 251 which may be welded to the channels 184 and thus provide increased bearing surfaces for the strips 250. Rivets 252 extend through the base flanges of the rails 249, the strips 250 and the horizontal flanges of the angle brackets 251 and thus secure the rails 249 to the supporting structure.

It should be noted that, inasmuch as the bridge FB, during normal operations, is at times directly before the roughing mill RM, and, again, at other times the coiler FC is directly before the mill RM, both tracks 184 and 249 must overlap so as to make these movements of the bridge and coiler possible. By mounting one pair of rails above the other, in the manner illustrated, the desired operations are obtainable.

The bridge section FB is made up of table sections and intervening rolls just as is the main portion of the table FT. In the particular embodiment disclosed, there is an intermediate section 253 and end sections 254, the end sections being narrower than the central section 253. These sections are preferably castings provided with supporting flanges which rest upon a frame 255 which comprises end members 256 and longitudinal members 257. The frame 255 is mounted upon the wheels 248, suitable depending bearings 258 being provided for this purpose. The table rollers 259, which occupy the spaces between the central table section 253 and the end table sections 254, are suitably journaled in bearings 260 formed upon the car frame 255. The supporting wheels 248, of which there are two pairs, are secured to axles 261 which are journaled in the bearings 258.

In order to positively drive the rollers 259, the latter are provided at the same end with sprocket wheels 262, 263 mounted upon roller shafts 264 and 265, respectively. A sprocket chain 266 transmits power from the shaft 265 to the shaft 264. The shaft 265 is of considerable length and is journaled in its outer end in a suitable support 246. Near its outer end it is provided with a sprocket wheel 267 over which passes a sprocket chain 268. The latter passes over a driving sprocket wheel 269, secured to a shaft 270 suitably journaled in bearings in the support 246 and in an additional support 271. The shaft 270 is an extension of the shaft of the last roller 240 of the table FT. As before pointed out, the rollers 240 are driven from the shaft 243 and since the last of the rollers is so driven its shaft 270 is also so driven.

Since the bridge FB must be moved to and fro in the direction of the shaft 265, it is necessary to provide for the maintenance of a driving connection for the bridge rollers 259 for all positions of the bridge. This is preferably done by mounting the sprocket wheel 267 upon the shaft 265 with a sliding connection. This may be obtained in various ways, but, in the present instance, is provided by giving the shaft 265 a feather key 274, relative to which the sprocket wheel 267 may not be rotated. As shown more particularly in Fig. 1, the sprocket wheel 267 is held in alinement with the sprocket wheel 269, from which it receives its rotations, by locating the supports 246 and 271 so that they lie close to opposite sides of the sprocket wheel 267 and prevent its being displaced along its axis, relatively to the driving sprocket wheel 269. With this arrangement, it will be seen that when the bridging section FB is moved out of its position in alinement with the passes of the roughing mill RM, the shaft 265 will pass along through the sprocket wheel 267 without changing the rotary functions of the various parts. Similarly, when the bridge is restored to its operative position before the mill, the sprocket wheel 267 will still be in operative relation with the shaft 267 and thus able to drive the rollers 259 of the bridge.

In order to shift the coiler FC and associated bridge FB back and forth in the manner previously indicated, various arrangements may be employed. In the present instance, however, the drum FD cooperates with a cable or other like flexible member to this end. The cable is functionally continuous although made up of a long section 275 and a short section 276. The short section 276 merely connects the car 255 of the bridge member FB to one of the housing members 176 of the associated coiler FC, the connection being made through a member 247 which spans the adjacent gearing on the coiler.

The longer section of the cable passes around the drum FD preferably, in one or more complete turns, and then over an associated sheave 277 located just above the drum FD, and finally over another sheave 278 located adjacent to, but beyond, the finishing mill, the latter sheave lying beneath the coiler driving shafts 160, 161 and 162. One end of the cable 275 is connected to the adjacent end of the coiler frame 177. That end of the cable 275 which is nearest the sheave 277 is connected to the adjacent end of the car 255 of the bridging section FB. The actuating drum FD and the associated sheave 277 are suitably journaled in spaced supports 279, mounted upon a base 280, which also carries the motor $M^3$. It will be obvious that, as the motor $M^3$ rotates the drum FD, the cable will draw upon the coiler and bridge and the latter may be shifted back and forth according to the rotations given the drum FD. The motor $M^3$ is a reversible electric motor and by driving it in one direction or the other the coiler and bridge may be shifted back and forth as required.

What has been said about the table FT, the bridge FB, the actuating drum FD and the associated parts and their operations will apply equally to the corresponding parts at the rear of the mill, namely the rear table RT, the bridge RB, the drum RD, the pinch rolls $P^2$, $P^4$ and other parts and the same reference letters may be applied to the corresponding parts, without the necessity of further description.

Obviously, as before indicated, the roughing mill rolls and the finishing mill rolls may differ in arrangement and in numbers of passes, from those heretofore described. Indeed, the design of the rolls may differ greatly in both mills. However, for the purpose of showing possibilities in this direction I have illustrated two sets of three-high rolls, one for use in the roughing mill and the other for use in the finishing mill. These are shown respectively in Figs. 21 and 22 and are arranged for a maximum of six passes.

Thus, the roughing rolls 283, 284 and 285 are positioned as indicated and each roll has end collars 292 and two intermediate collars 293. The collars are all of uniform diameter and operatively engage each other so as to maintain exact passes between the rolls. The passes are not bulbous in cross-section as in the case of the previously described roughing rolls, but are rectangular in cross-section, that is to say, they are flat passes and provide for a uniform thickness throughout the cross-section. In the embodiment illustrated, the largest pass 286 lies between the rolls 283 and 284; the next pass in order of size is pass 287 lying between the rolls 284 and 285 directly beneath the pass 286; the third pass 288 is still smaller than the pass 287 and lies between the rolls 283 and 284 and between the intermediate collars 293; the fourth pass 289 is beneath the pass 288 and between rolls 284 and 285; the fifth pass is the pass 290 lying between the rolls 284 and 285. In many instances these five passes will be all that will be required. In such case the space between the collars 292 and 293 directly above the pass 290 may be left with the same diameter as the adjacent collars, but, as here illustrated, the same is cut away slightly so as to provide a sixth pass 291 having the least depth of all. In practice, when these rolls are set so that their collars operatively engage, the strip may be passed back and forth through the passes in succession proceeding from the largest to the smallest without changing the rolls in any way.

When the strip has been put through all its roughing passes, then it will be moved to the finishing mill as before explained. The finishing rolls of Fig. 22 are rolls that may be used with different roughing rolls. In the present instance, however, the finishing rolls of Fig. 22 are designed for, and are capable of use with, the roughing rolls of Fig. 21. The finishing rolls include an upper roll 296, an intermediate roll 297, and a lower roll 298. The rolls in this case are provided, as before indicated, with end collars 299 and two intermediate collars 300 in the case of each roll. These collars are of uniform diameter and bear upon each other as before mentioned and thus maintain exact passes. In this instance, the passes, running from the largest to the smallest, are passes 301, 302, 303, 304, 305 and 306. These lie between the different rolls and between the different collars as clearly shown. In this case also, the rolls, when once set so as to bring the cooperating collars 299 and 300 into proper running engagement with each other, may be left unchanged and the strip passed successively through the different passes until it is brought to the desired thickness. In this way the action is like that of a continuous mill. The desired thickness may be obtained after passing the strip through but one or two passes of the mill, or any other number, up to and including the sixth and last pass 306. When the last pass has been traversed, then the strip cannot be made any thinner upon that particular mill. Other thicknesses which are permissible with the roller arrangement shown would give thicknesses corresponding to the depths of the passes 305, 304, 303, 302 or 301 according to the number of passes that are used in finishing the strip.

In instances where there is need of considerable flexibility in the thicknesses that must be produced in the strips, then the rolls which have collars upon them may give way to rollers without collars. Such are shown in Fig. 23. There a three-high roll arrangement is shown. The rolls there shown are the upper roll 309, the intermediate roll 310 and the lower roll 311. These rolls have cylindrical faces throughout and are adapted to engage throughout the entire width of the rolls. Obviously, with these finishing rolls in service it will be necessary to use the screw-down mechanisms of the finishing mill to set the rolls for the thickness desired. In such event it may be necessary to adjust the rolls after each passage of the strip. Again, the strip may be put through the passes a number of times without changing the roll setting. In the latter event, of course, there would be a different finish given to the strip. These variations are all possible and will occur to persons skilled in the strip rolling art. What is here given will illustrate, however, the possibilities in this connection. It will be noted, however, that where the collars are employed on the rolls there is a great saving of time as it is not necessary to change the screw-down adjustments between passes.

Of course where the roll lengths are different, as, for example, if the length of the rolls of Figs. 21, 22 and 23 be longer than those of Fig. 1, then the housings would have to be differently spaced, and the separators 32 or 57 given proper lengths. And there might be other changes required to properly position the various mill parts.

As previously pointed out, the handling of the strip while putting it through the passes of the roughing mill RM may in some instances require passing the strip between the rolls of the edger E and in other instances the strip may be passed along the roller table FT without using the edger E. In the latter case a trough 314 is positioned on the table FT and the frame of the edger E so as to provide inclined surfaces over which the strip may be passed above the edger.

The trough 314 is diagrammatically indicated in Fig. 2. It is portable so that it may be placed upon or removed from the roller table and edger according to the requirements. Of course, other ways of guiding the strip might be provided but what is here presented is typical and should suffice for the purposes of the present disclosure.

The edging mill E may be of any desired construction. That which is illustrated may therefore be replaced by an edger of any other design. The edger in this case comprises a pair of grooved rolls 315 which are mounted upon vertical shafts suitably journaled in bearings in the frame 316. The shafts which carry the edging wheels 315 are preferably geared together so as to move at the same peripheral speed and in opposite directions. The passage of the strip through the edger with the strip edges in the grooves of the wheels 315, results in giving the strip a proper width. The shafts may be driven from any suitable source of power such as an electric motor $M^6$ properly geared to the upright shafts. The details of the edger are not herein disclosed as the same in itself forms no part of the present invention and, furthermore, many different forms of edgers will answer the purpose. As clearly shown in Fig. 1, the edger occupies the space of a single table section 239, one having been removed from the roller table FT to provide space for the edger. The latter is carried upon a suitable supporting foundation the same as the table FT.

In operation, the edger E may be brought into service at different times as desired. Thus, for example, the strip might be put through passes as follows: first, forward through edger pass, the guiding trough 314 being removed meanwhile; second, forward through the first pass of the roughing mill RM; third, back through the second pass of the roughing mill, the guide 314 being in place now and the strip passing over the edger; and fourth, forward through the edger again, the guide 314 being again removed to permit the last. The action of edging the strip in the first pass results in breaking the scale from the surface. This scale is removed by means of high pressure water or steam played on the surface.

From what has been said, it will be seen that by using rolls having collars, and hence passes of fixed cross-section, all the work of rolling several times through the same pass is avoided. By continuous operation, without reversals, there is also a great saving of time. A practically continuous operation at uniform speed is obtained, even though the roughing and finishing stands be driven at different speeds, as they are, in order that the finishing rolls may take care of the material produced at the roughing rolls, the finishing rolls providing the greater peripheral speed by reason of having their diameters greater than those of the roughing rolls. It has been estimated that with the drive herein disclosed, there is a saving equal to twenty per cent (20%) of the entire rolling time. In some circumstances, it might be preferred to drive the roughing and finishing stands by separate drives. Then a larger bar might be fed to the roughing passes and the speed of the roughing rolls varied as the metal was worked upon. A variable speed motor would then be used to drive the roughing rolls. Thus, the efficiency of the mill would be increased and the finishing stand could operate at a higher speed. However, with the single drive for the mills RM and FM, the coilers FC and RC, and the pinch rolls P¹, P², P³ and P⁴, there are certain other advantages than those before enumerated. One of these, which is important, is the elimination of roll chatter in the mills RM and FM, due to the drag which is placed upon the mill rolls by having the coilers and pinch rolls driven through them. The drag thus provided makes for much better finish on the strip. However, these different ways of driving are merely optional; either may be employed, as desired.

It should also be noted that after a strip is formed into a coil upon one of the coilers it need not always be fed back through the forming rolls of that coiler, as shown in Fig. 3 but the end of the coil may be freed from the forming rolls and started back through the next mill pass; or, again, the coil might be removed from the coiler altogether and then started back through the next pass. These are all matters of judgment on the part of the operators of the mill plant and may be varied as heating, cooling or other requirements or conditions may require. There will also be many other variations in the handling of the metal that will occur to operators skilled in the art.

Obviously, in carrying out my invention in practical form many other alterations and modifications may be made in the various machines, machine elements and other parts or in the methods of use disclosed without departing from the spirit and scope of my invention. I therefore aim to cover by the terms of the appended claims all those alterations and modifications in structure and in the method of using those structures which rightly come within the purview of my invention.

I claim:

1. In a hot rolling mill plant, roughing and finishing mill stands having the roll axes in substantial alinement, and front and rear coilers movable along lines substantially parallel to the axes of said rolls into and out of alinement with the paths of travel of the work through the passes of said stands, respectively.

2. In a hot rolling mill plant, a roughing mill stand, a finishing mill stand, the lines of travel of the work through the two stands being substantially parallel, a front coiler and a rear coiler for the work, said coilers being movable in substantially parallel paths on the front and rear of said stands, respectively, into receiving and discharging positions in said lines of travel, and means for moving said coilers back and forth in said parallel paths between said operative positions, said means including winding drums and sheaves and associated cables operatively engaging said drums and sheaves and being secured to said coilers, respectively.

3. In a hot rolling mill plant, roughing and finishing mill stands having the roll axes in substantial alinement, front and rear coilers movable along lines substantially parallel to the axes of said rolls into and out of alinement with the paths of travel of the work through the passes of said stands, respectively, the lines of travel of the work through the two stands being substantially parallel, a front coiler and a rear coiler for the work, said coilers being movable in substantially parallel paths on the front and rear of said stands, respectively, into receiving and discharging positions in said lines of travel of the work, and means for moving said coilers back and forth in said parallel paths between said operative positions, said means including winding drums and sheaves and associated cables operatively engaging said drums and sheaves and being secured to said coilers, respectively.

4. In a hot rolling mill plant, a roughing mill stand, a finishing mill stand, the lines of travel of the work through the two stands being substantially parallel, a front coiler and a rear coiler for the work, tracks for said coilers extending respectively in the front and rear of said stands in directions transverse to the lines of travel of the work, each coiler comprising a car having wheels engaging said tracks and adapted to travel thereon, coiling elements on said car, gearing on said car for driving said elements, power driven gearing supported independently of said car, and flexible connections between said power driven gearing and said driving gearing on said car whereby the latter gearing is driven from the former.

5. In a hot rolling mill plant, a roughing mill stand, a finishing mill stand, the lines of travel of the work through the two stands being substantially parallel, a front coiler and a rear coiler for the work, tracks for said coilers extending respectively in the front and rear of said stands in directions transverse to the lines of travel of the work, each coiler comprising a car having wheels engaging said tracks and adapted to travel thereon, coiling elements on said car, gearing on said car for driving said elements, power driven gearing supported independently of said car, flexible connections between said power driven gearing and said driving gearing on said car whereby the latter gearing is driven from the former, and means for moving each coiler back and forth along its track, said means including a winding drum and associated cable, said cable operatively engaging said drum at an intermediate point, means for connecting said cable to the coiler car, and an idler sheave cooperating with said cable and being positioned on the opposite side of said car from said drum.

6. In a hot rolling mill plant, a roughing mill stand, a finishing mill stand, the lines of travel of the work through the two stands being substantially parallel, feed tables in the line of travel of the roughing mill, one on the front and another at the rear, each of said tables having a gap adjacent to the mill stand, a bridge for each gap, means for moving said bridges into and out of gap-closing positions, coilers, means for moving said coilers into said gaps when said bridges are out and vice versa, said coilers being in line with the rolls of the finishing mill passes when said gaps are closed by said bridges.

7. In a hot rolling mill plant, a roughing mill stand, a finishing mill stand, the lines of travel of the work through the two stands being substantially parallel, feed tables in the line of travel of the roughing mill, one on the front and another at the rear, each of said tables having a gap adjacent to the mill stand, a bridge for each gap, coilers, means for moving said bridges and coilers alternately into said gaps, said means including cables and winding drums and idling sheaves, one cable being provided for each coiler and the corresponding bridge.

8. In a rolling mill plant, two mill stands side by side, the lines of travel of the work through the two stands being substantially parallel, a feed table in the line of work travel of the first of said stands, said table having a removable section, a transverse track on which said section is adapted to travel to open the gap in said table and to close the same, and a coiler movable into said gap as said section is removed therefrom and vice versa, said coiler being positioned in the work travel line of the second of said stands when said removable section closes said gap.

9. In a rolling mill plant, two mill stands side by side, the lines of travel of the work through the two stands being substantially parallel, a feed table in the line of work travel of the first of said stands, said table having a removable bridging section, a coiler, transverse track rails on which said section and coiler are adapted to travel to open and close the gap in said table, and means for moving said removable section and said coiler in unison to close said gap, at one time by said section and at another time by said coiler, the coiler being in the work travel line of the second of said stands when said removable section closes said gap.

10. In a rolling mill plant, two mill stands side by side, the lines of travel of the work through the two stands being substantially parallel, a feed table in the line of work travel of the first of said stands, said table having a removable bridging section, a coiler, transverse track rails on which said section and coiler are adapted to travel to open and close the gap in said table, a cable secured to said coiler and removable section, and means for moving said cable in alternate directions to position said coiler and section in said gap as desired, the coiler being in the work travel line of the second of said stands when said removable section closes said gap.

11. In a rolling mill plant, a mill stand, a feed table in the line of work travel through said stand, said table having a removable section for opening and closing a gap in said table adjacent to said stand, a track extending transversely of said table near said gap, a cable secured to said removable section, and means for pulling on said cable to move said section along said track into and out of said gap.

12. In a hot rolling mill plant, a roughing mill stand, a finishing mill stand, the lines of travel of the work through the two stands being substantially parallel, a coiler movable transversely of said lines of work travel, a track, said coiler comprising a car having wheels engaging said track rails and adapted to travel thereon, coiling elements on said car, gearing on said car for driving said elements, power driving gearing mounted independently of said car, and flexible power transmitting connections between said power driving gearing and said driving gearing on said car whereby the latter gearing is driven from the former.

13. In a rolling mill plant, a mill stand, a feed table in the line of work travel through said stand, said table having a removable section for opening and closing a gap in said table adjacent to said stand, a coiler, track rails extending transversely of said table near said gap, said removable section being movable along certain of said track rails into and out of gap closing position and said coiler being movable along certain of said track rails into and out of said gap alternately with said removable section, a cable secured to said coiler and removable section, and means for pulling on said cable to move said coiler and removable section into said gap alternately.

14. In a rolling mill plant, a mill stand, a feed table in the line of work travel through said stand, said table having a fixed frame, table sections secured to said frame with intervening spaces between them, advancing rollers journaled in said frame and occupying said spaces, means for driving said rollers to advance the work placed on the table, said table having a gap at one point in its length, a movable conveying structure for bridging said gap, said bridging structure including a plurality of table sections with intervening propelling rollers, gearing between said propelling rollers, and adjustable driving connections between the rollers of said structure on the one hand and the advancing rollers of said frame on the other hand whereby the structure rollers are kept in gear with the table rollers in all positions of said structure both within and outside of said gap.

15. In a rolling mill plant, a mill stand, a feed table in the line of work travel through said stand, said table having a fixed frame, table sections secured to said frame with intervening spaces between them, advancing rollers journaled in said frame and occupying said spaces, means for driving said rollers to advance the work placed on the table, said table having a gap at one point in its length, a movable conveying structure for bridging said gap, said bridging structure including a supporting frame, spaced table sections secured to said supporting frame, propelling rollers journaled in said supporting frame and occupying the spaces between the table sections, and driving gearing between a main table roller and a roller on said supporting frame, said gearing including telescopic members to permit movement of said structure into and out of said gap without interrupting the driving connection with said driving gearing.

16. In a rolling mill plant, a mill stand, a feed table in the line of work travel through said stand, said table having a fixed frame, table sections secured to said frame with intervening spaces between them, advancing rollers journaled in said frame and occupying said spaces, means for driving said rollers to advance the work placed on the table, said table having a gap at one point in its length, a movable conveying structure for bridging said gap, transverse track rails, said bridging structure including a supporting frame, wheels on said frame adapted to engage and travel on said rails, spaced table sections secured to said supporting frame, propelling rollers journaled in said supporting frame and occupying the spaces between the table sections, and driving gearing between a main table roller and a roller on said supporting frame, said gearing including telescopic members to permit movement of said structure into and out of said gap without interrupting the driving connection with said driving gearing.

17. In a mill plant, a mill stand, a feed table in the line of travel of the work through said stand, said table having a gap, a bridge for closing said gap, a coiler movable into said gap to replace the bridge thereof, said coiler having three cooperating coiling rolls, gear wheels keyed to said rolls and being movable with the coiler, a set of three gear wheels mounted on a fixed support, three telescopic shafts and three sets of cooperating universal joints, connecting the three gear wheels on the fixed support to the corresponding three gear wheels on the coiler, and means for driving the former and through them and the telescopic shafts, the three rolls of said coiler.

18. In a hot rolling mill plant, a roughing mill stand, a finishing mill stand, the lines of travel of the work through the two stands being substantially parallel, feed tables in the line of travel of the roughing mill, one at the front and another at the rear, each of said tables having a gap adjacent to the mill stand, a bridge for each gap, means for moving said bridges into and out of gap closing positions, coilers, means for moving said coilers into said gaps when said bridges are out and vice versa, said coilers being in line with the rolls of the finishing mill passes when said gaps are closed by said bridges, and said coilers each having a heat insulating enclosure for the coil whereby the heat of the hot metal is retained during rolling operations wherein the coilers are employed.

19. In a rolling mill plant, two mill stands side by side, the lines of travel of the work through the two stands being substantially parallel, a feed table in the line of work travel of the first of said stands, said table having a removable section, a transverse track on which said section is adapted to travel to open the gap in said table and to close the same, a coiler movable into said gap as said section is removed therefrom and vice versa, said coiler being positioned in the work travel line of the second of said stands when said removable section closes said gap, and said coilers each having a heat insulating enclosure for the coil whereby the heat of the hot metal is retained during rolling operations wherein the coilers are employed.

20. In combination, a mill, feed tables in the line of travel of the mill, one at the front and another at the rear, said tables being of such character as to support a flat piece of work from the time of issuance thereof from between the rolls of the mill until it has been fed back through the mill, the tables being effective to support the work while it is relatively thick and in an uncoiled state, sections of the tables being removable laterally of the axis of said tables to leave gaps therein, coilers adapted to automatically reel in and pay out the work rolled on the mill when the same has been thinned and elongated, and other work handling means positioned to one side of said tables, said coilers being movable into different operating positions, one position being in said gaps wherein said coilers are in operative relation to said mill to reel in and pay out the work after it has been sufficiently thinned and elongated by said mill, and the other position being before said other work handling means wherein the coilers are similarly operative to reel in and pay out the work in conjunction with the operation of said means, said coilers in the latter event being out of the way of other work pieces traveling along said tables, including said sections replaced therein, and being flat rolled by said mill.

21. In a hot rolling mill plant, a roughing mill, feed tables in the line of travel of said roughing mill, one at the front and another at the rear, said tables being of such character as to support a flat piece of work from the time of issuance thereof from between the rolls of said roughing mill until it has been fed back again through the same mill, the tables being effective to support the work while it is relatively thick and in an uncoiled state, sections of said tables being movable laterally of the axis of said tables to leave gaps therein, a second mill having a line of travel substantially parallel to the line of travel of said roughing mill, said two mills being positioned side by side with their roll axes in substantial alinement, a front coiler, and a rear coiler, both said coilers being adapted to reel in and pay out work when the same has been thinned and elongated as aforesaid, said coilers being movable in substantially parallel paths on the front and rear of said alined mills into reeling in and paying out positions relative to said mills alternately.

22. In a hot rolling mill plant, a roughing mill, feed tables in the line of travel of said roughing mill, one at the front and another at the rear, said tables being of such character as to support a flat piece of work from the time of issuance thereof from between the rolls of said roughing mill until it has been fed back again through the same mill, the tables being effective to support the work while it is relatively thick and in an uncoiled state, a section of one of said tables being removable laterally of the line of travel of the table to leave a gap therein, a second mill positioned adjacent to said roughing mill, and a coiler movable to and fro between operative positions, the one position being in said gap before said roughing mill and the other position being before said second mill, said coiler being operative to reel in and pay out work when the same has been thinned and elongated as aforesaid, thereby being adapted to receive work delivered by said roughing mill and to deliver the same to said second mill.

23. In a rolling mill plant, a mill, a feed table in the line of travel of the work through said mill, said table having a removable section for opening and closing a gap in said table adjacent to said mill, a coiler movable transversely of said line of travel into said gap as said section is removed therefrom and vice versa, other work handling means in position to receive work from said coiler when said coiler is positioned before said other work handling means, and means for insuring the said positioning of said coiler before said other work handling means when said section operatively closes said gap in said table, whereby both said mill and said other work handling means may operate simultaneously on different pieces of work.

24. In a hot rolling mill plant, a roughing mill stand, a finishing mill stand, the lines of travel of the work through the two stands being substantially parallel, and a front centerless coiler and a rear centerless coiler for the work, said coilers being movable in substantially parallel paths on the front and rear of said stands, respectively, into receiving and discharging positions in said lines of travel, said coilers each having a heat insulating enclosure for the coil and said enclosures each having a movable hood which may be opened to allow the contained coil to be removed from the enclosure through the opening thus provided.

25. In a hot rolling mill plant, a roughing mill, feed tables in the line of travel of said roughing mill, one at the front and another at the rear, said tables being of such character as to support a flat piece of work from the time of issuance thereof from between the rolls of said roughing mill until it has been fed back again through the same mill, the tables being effective to support the work while it is relatively thick and in an uncoiled state, a section of one of said tables being removable laterally of the line of travel of the work thereover to leave a gap in said table, a second mill positioned adjacent to said roughing mill, a heat insulating coiler enclosure having a movable hood which may be opened to permit the removal of a coil of the work coiled therein, and a coiler within said enclosure for coiling the work into a coil which coil may be readily removed as a unit from said enclosure through its open top, said enclosure and contained coiler being movable to and fro between operative positions, the one position being in said gap before said roughing mill and the other position being before said second mill, said coiler being operative to reel in and pay out the work when the same has been thinned and elongated as aforesaid, thereby being operative to receive work delivered by said roughing mill and to deliver the same to said second mill.

26. In a hot rolling mill plant, a mill stand, a feed table in the line of work travel through said stand, said table having a removable section for opening and closing a gap in said table adjacent to said stand, a second work handling means, a heat insulating coiler enclosure having a movable hood which may be opened to permit the removal of a coil of the work coiled therein, a coiler within said enclosure for coiling the work into a coil which coil may be readily removed as a unit from said enclosure through its open top, said enclosure and contained coiler being movable into said gap as said section is removed therefrom and vice versa, said coiler being operative to reel in, and pay out the work when the same has been thinned and elongated as aforesaid, thereby being operative to receive work delivered by said roughing mill and to deliver the same to said second work handling means, and means for insuring the said positioning of said coiler before said work handling means when said section operatively closes said gap in said table, whereby both the mill of said mill stand and said other work handling means may operate simultaneously on different pieces of work.

27. In a rolling mill plant, a rolling mill, a horizontal feed table in vertical alignment with said mill, said table having therein a horizontally removable section but said table being otherwise positionally fixed, an associated coiler, and means for moving said coiler and section to and fro in a horizontal plane between operative positions, the one position having said section in alignment with said table and said coiler displaced therefrom and the other position having said coiler in alignment with said table and said section displaced therefrom, whereby in said first position said mill may be operated to roll work fed along said table and simultaneously therewith said coiler may be emptied of its coil and in said second position said coiler may be operated to reel in work rolled by said mill.

28. In combination, a rolling mill adapted for the horizontal rolling of work first in one direction and then in the other, two horizontally disposed feed tables in the line of travel of the work passing through said mill, one at the front of said mill and the other at the rear, one of said tables having a horizontally movable section normally positioned to serve with the rest of said tables in feeding the work back and forth through said mill and movable laterally in the horizontal plane of the tops of said tables to provide a gap, and a coiler movable laterally in a horizontal plane back and forth between two positions, the one position being a displaced position out of the way of the work being fed back and forth on said tables, and the second position being in said gap in operative coiling and uncoiling relation to said mill.

29. The combination with a mill, of horizontal feed tables in the line of travel of said mill arranged to support the work while the same is being rolled back and forth in a general horizontal direction through the mill, pinch rolls at the front and rear of the mill and between said mill and the associated tables, said pinch rolls being in the horizontal plane of the table and operating to engage the work issuing from the mill rolls, said tables having horizontally removable sections adjacent to said pinch rolls and on the far side of the same, respectively, from said mill, and coilers horizontally movable to replace said table sections in positions adjacent to said pinch rolls ready to cooperate with said pinch rolls and mill in coiling and uncoiling operations, said coilers when not replacing said sections being shifted in a horizontal plane away from said tables so as not to interfere with the to and fro travel of work thereon as it is being rolled, whereby said coiler may be emptied of one piece of work while the mill is operating upon another piece of work.

30. In combination with a mill, of feed tables in the line of travel of the mill, the one at the front and another at the rear, said tables being of such character as to support a flat piece of work from the time of issuance thereof from between the rolls of the mill until it has been fed back through the mill, the tables being effective for supporting the work while it is relatively thick and in an uncoiled state, sections of the tables being movable from their normal positions therein to abnormal positions to leave gaps in said tables both forward of and in the rear of said mill, pinch rolls at the front and rear of said mill and between said mill and said sections, respectively, other work handling means positioned to one side of said tables, and coilers movable into said gaps and away from said gaps into operative relation to said other work handling means, whereby said coilers may be used in reeling in the work rolled on said mill when the same has been thinned and elongated and then paying out the same to said other work handling means, said operations of the coiler before said means being wholly independent of and without hindrance to the flat rolling operations of said mill.

31. In combination, a mill, horizontal feed tables in the line of travel of said mill, one at the front and another at the rear, said tables being of such character as to support a flat piece of work from the time of issuance thereof from between the rolls of the mill until it has been fed back through the mill, the general movement of the work being in a horizontal plane, the tables being effective to support the work while it is relatively thick and in an uncoiled state, a section of one of said tables being horizontally removable laterally of the axis of said tables to leave a gap therein, a coiler adapted to automatically reel in and pay out the work rolled on the mill when the same has been thinned and elongated and means for moving said coiler and section to and fro in a horizontal plane between operative positions, the one position having said section in alignment with said table and said coiler displaced therefrom and the other position having said coiler in alignment with said table and said section displaced therefrom, whereby in said first position said mill may be operated to roll work fed along said table and simultaneously therewith said coiler may be emptied of its coil and in said second position said coiler may be operated to reel in work rolled by said mill.

32. In a rolling mill plant, a mill for rolling hot metal, a feed table in alignment with said mill, said table having therein a removable section movable laterally of the axis of said table, a heat insulating coiler enclosure having a movable hood which may be opened to permit the removal of a coil of the work coiled therein, a coiler within said enclosure for coiling the work into a coil which coil may be readily removed as a unit from the enclosure through its open top, and means for moving said enclosed coiler and section to and fro between operative positions, the one position having said section in alignment with said table and said coiler displaced therefrom and the other position having said coiler in alignment with said table and said section displaced therefrom, whereby in said first position said mill may be operated to roll work fed along said table and simultaneously therewith said coiler may be emptied of its coil and in said second position said coiler may be operated to reel in work rolled by said mill.

33. In a hot rolling mill plant, a mill, a substantially horizontal feed table in the line of travel of the hot metal through said mill, said table having a removable section for opening and closing a gap in said table adjacent to said mill, said section being movable in a substantially horizontal plane in a direction transverse to said line of travel of the hot metal, a coiler movable in the same plane and direction as said section and spaced from said section by a constant distance, the coiler occupying a first position in said gap with said section remote therefrom and a second position remote from said gap when said section bridges said gap, other means cooperating with hot metal removed from said coiler when the latter is in said second position, a heat insulating enclosure for said coiler operative to hold the heat of the hot metal therein both while the coiler is coiling the hot metal in said first position and while the coiler with the coiled metal therein is being conveyed from said first position to said second position, and means for shifting said coiler and section to and fro in said horizontal plane and transverse direction as aforesaid while maintaining the same in said spaced relation, whereby the coiler may be emptied of one piece of hot metal while the mill is operating upon another piece.

34. In a hot rolling mill plant, a mill, a substantially horizontal feed table in the line of travel of the hot metal through said mill, said table having a removable section for opening and closing a gap in said table adjacent to said mill, said section being movable in a substantially horizontal plane in a direction transverse to said line of travel of the hot metal, a coiler movable in the same plane and direction as said section and spaced from said section by a constant distance, the coiler occupying a first position in said gap with said section remote therefrom and a second position remote from said gap when said section bridges said gap, other means cooperating with hot metal removed from said coiler when the latter is in said second position, a heat insulating enclosure for said coiler operative to hold the heat of the hot metal therein both while the coiler is coiling the hot metal in said first position and while the coiler with the coiled metal therein is being conveyed from said first position to said second position, said enclosure having an operable hood which may be opened to allow removal of the coil as a unit from said enclosure, and means for shifting said coiler and section to and fro in said horizontal plane and transverse direction as aforesaid while maintaining the same in said spaced relation to each other, whereby the coiler may be emptied of one piece of hot metal while the mill is operating upon another piece.

35. In a rolling mill plant, a mill, a horizontal feed table in the line of travel of the work through said mill, said table having a horizontally removable section for opening and closing a gap in said table adjacent to said mill, a coiler horizontally removable transversely of said line of travel into said gap as said section is horizontally removed therefrom and vice versa, other means in position to receive work from said coiler when said section closes said gap, means for simultaneously moving said section and coiler to insure the said positioning of said coiler before said other means when said section operatively closes said gap and vice versa.

36. In a hot rolling mill plant, a mill, a horizontal feed table in the line of travel of the work through said mill, said table having a horizontally removable section for opening and closing a gap in said table adjacent to said mill, a coiler horizontally removable transversely of said line of travel into said gap as said section is horizontally removed therefrom and vice versa, other means in position to receive work from said coiler when said section closes said gap, a heat insulating enclosure for said coiler operative to hold the heat of the hot work therein both while the coiler is in the act of coiling up the work and while it is being conveyed with the coil of work upon it into operative position relative to said other means, and means for moving said section and coiler at intervals to insure the said positioning of said coiler before said other means when said section operatively closes said gap and vice versa.

GEORGE GORDON LLOYD.